(12) United States Patent
Andriolo

(10) Patent No.: US 6,872,763 B2
(45) Date of Patent: Mar. 29, 2005

(54) BITUMEN VULCANIZING COMPOSITION

(75) Inventor: Patrizio Andriolo, Morlanwelz (BE)

(73) Assignee: ATOFINA Research, S.A., Feluy (BE)

( * ) Notice: Subject to any disclaimer, the term of this patent is extended or adjusted under 35 U.S.C. 154(b) by 0 days.

(21) Appl. No.: 10/399,572

(22) PCT Filed: Oct. 24, 2001

(86) PCT No.: PCT/EP01/12341

§ 371 (c)(1),
(2), (4) Date: Sep. 11, 2003

(87) PCT Pub. No.: WO02/34835

PCT Pub. Date: May 2, 2002

(65) Prior Publication Data

US 2004/0054038 A1 Mar. 18, 2004

(30) Foreign Application Priority Data

Oct. 24, 2000 (EP) .............................. 00309342

(51) Int. Cl.$^7$ .............................. C08L 95/00
(52) U.S. Cl. .............................. 524/68; 524/69; 524/70; 524/71
(58) Field of Search .............................. 524/68–71, 80, 524/85, 202

(56) References Cited

U.S. PATENT DOCUMENTS

| | | | | |
|---|---|---|---|---|
| 2,640,088 A | * | 5/1953 | Glenn et al. | 524/17 |
| 2,912,388 A | * | 11/1959 | Leahy et al. | 252/511 |
| 2,933,464 A | * | 4/1960 | Gibbs | 524/83 |
| 5,508,112 A | | 4/1996 | Planche et al. | |
| 5,795,929 A | | 8/1998 | Grubba | |
| 6,025,418 A | | 2/2000 | Defoor et al. | |

FOREIGN PATENT DOCUMENTS

| | | |
|---|---|---|
| EP | 0384254 A2 | 8/1990 |
| GB | 2270318 A | 3/1994 |

* cited by examiner

*Primary Examiner*—Peter Szekely
(74) *Attorney, Agent, or Firm*—William D. Jackson

(57) ABSTRACT

Provided is a vulcanizing agent for vulcanizing bitumen, which vulcanizing agent comprises a sulphur agent and a binder, wherein the vulcanizing agent is in the form of pellets. Further provided is a process for producing a surfacing composition, which process comprises contacting bitumen with an elastomer and the vulcanizing agent of the present invention.

16 Claims, No Drawings

BITUMEN VULCANIZING COMPOSITION

The present invention concerns a composition for vulcanising bitumen. The bitumen is then useful as a surfacing composition in, for example, road surfacing. The invention provides a vulcanising composition which when mixed with bitumen and an elastomer gives rise to a composition having improved stability and aging properties. The invention also relates to methods for forming the vulcanising composition and road surfacing composition, and to the surfacing composition itself.

It has been known for some time to add elastomeric polymers to bitumen to form a useful road surfacing composition. The elastomer provides the advantage of allowing the composition to deform under pressure (e.g. when a vehicle is driven across it) and then to return to its original state. This increases the lifetime of the road surface. It has also been known for some time to add sulphur or sulphur containing compounds to such compositions to further strengthen it by introducing cross-linking. This cross-linking is termed vulcanisation. The formation of such compositions is generally carried out in two steps: the elastomer is added to the bitumen and fully dispersed, and then the vulcanising agent is added and cross-linking is allowed to occur. A number of published patent applications describe such processes, including WO 98/47966, WO 92/11321, WO 90/02776, WO 93/18092, and WO 96/15193.

A specific process of this type is disclosed in published European patent, EP 424 420. This document discloses formation of a bitumen composition in two steps. An elastomeric polymer (SBS) is dispersed in bitumen at a temperature of around 140–180° C. When the SBS has fully dispersed in the bitumen, vulcanising agents are added, including sulphur, a sulphur donor and other additives. The mixture is agitated for from 100–150 minutes at a temperature of from 140–180° C. to form the final composition.

In published French patent application FR 2 737 216 more recently developed an alternative one-step procedure for forming a surfacing composition from bitumen. This method makes use of a preliminary mixture ready for use, which preliminary mixture comprises SBS in powder form and cross-linking agents in powder form. The preliminary mixture is itself thus a powder.

There are a number of disadvantages associated with all of the above methods. The two-step processes are more time consuming and require separate storage of a larger number of different components. Moreover, the elastomer and cross-linking agent are in powder form and must be added separately. Thus, their proportions need to be determined on forming the surfacing composition. This process is prone to error leading to wastage and increased cost. The one-step process overcomes some of these problems, but is itself associated with further problems. The preliminary mixture is in a powder form and needs to be mixed since it is composed of more than one ingredient. Powders are subject to safety problems, since they are a fire and explosion hazard. This is particularly problematic for sulphur and sulphur-containing compounds. Moreover, powders are difficult to store and are subject to clogging and caking which makes them difficult to process.

An aim of the present invention is to solve the problems associated with the above prior art. It is a further aim of the present invention to provide a vulcanising composition which is safer, easier to use and gives rise to a final surfacing composition which has improved stability, storage and aging characteristics and allows a better control on the amount of product used in the compositions.

Accordingly, the present invention provides a vulcanising agent for vulcanising bitumen, which vulcanising agent comprises a sulphur agent and a binder, wherein the vulcanising agent is in the form of pellets. Generally the sulphur agent is dispersed with the binder. By pellets, it is meant a product comprising particulate matter collected together to form larger agglomerates. These agglomerates are not especially limited in shape or size, provided that they are not in a hazardous powder form, and may include an extrudate, tablet or pill formed by extrusion or compression of the vulcanising agent.

The present invention provides a pelletised vulcanising agent which avoids the hazards associated with powders, and can be employed in a one-step process to form a road surfacing agent with an elastomer and bitumen. By one step process is meant a process in which the elastomer and vulcanising agent can be added together to the bitumen, if desired. A two-step process requires that the elastomer and bitumen are thoroughly dispersed before the vulcanising agent is added. Surprisingly, the present vulcanising agent also improves the aging and stability of the surfacing composition in addition to the above advantages.

The various aspects of the present invention will now be discussed in more detail.

The vulcanising agent comprises a binder and a sulphur agent, the proportions of which are not especially limited, provided that the binder is present in sufficient quantity to allow pellets to be formed. In a preferred embodiment the vulcanising agent comprises 20 wt. % or more of the binder. More preferably the vulcanising agent comprises from 20–90 wt. % of the binder and from 10–80 wt. % of the sulphur agent. The vulcanising agent may also comprise from 0–30 wt. % of further additives. Preferably the sulphur agent comprises from 10–100 wt. % of elemental sulphur and from 0–90 wt. % of a sulphur-containing compound. The sulphur agent may thus comprise a sulphur donor, such as zinc dibutyl dithiocarbamate (ZDBC) or zinc mercaptobenzothiazol (ZMBT) or a sulphinamide. Preferred sulphur containing-compounds and sulphur donors may be found in the Rubber Handbook published by the Swedish Institution of Rubber Technology.

The binder is not especially limited, provided that it is capable of pelletising the sulphur agent. Preferably, however, the binder has a melting point (and/or softening point) below the melting point of sulphur, for ease of processing. In preferred embodiments, the binder comprises a wax, a hydrocarbon resin, a copolymer of ethylene and an acrylic ester. The more preferred binders include polyethylene (PE), glycol monostearate (GMS), ethyl vinyl alcohol (EVA) and copolymers of ethylene and acrylate esters.

A particularly preferred vulcanising agent is elemental sulphur, and a particularly preferred binder is EVA.

The vulcanising agent preferably comprises further additives. These additives are not especially limited and may be added to improve mixing and/or facilitate processing. They may also be selected to improve surface quality, especially road quality. Such further additives may comprise tackifiers, elastomers, bitumens, zinc oxide, and/or stearic acid.

The present invention also provides a process for production of the vulcanising agent, which process comprises:
(a) extruding a sulphur agent with a binder; or
(b) compressing a sulphur agent with a binder, at a temperature below the melting temperature of the sulphur agent, so as to form pellets of the vulcanisation agent.

The process is a standard compression or extrusion process and is well known in the art. Standard processing techniques and devices may be employed. The process preferably employs a temperature of 110° C. or less, since sulphur melts at around 119° C. However, if the sulphur agent as a whole has a higher melting temperature than this, then higher temperatures may be employed.

The present invention further provides a process for producing a surfacing composition, which process comprises contacting bitumen with an elastomer and a vulcanising agent as defined above. In a preferred embodiment, the process is carried out at a temperature of 100° C. or more. More preferably the process is carried out at a temperature of 120–200° C. As already mentioned above, this is a one-step process where the elastomer and vulcanising agent are added substantially simultaneously to the bitumen.

Generally from 1–15 parts by weight of elastomer are employed with from 85–99 parts by weight of bitumen. Preferably from 0.01–10 wt. %, more preferably from 0.1–5 wt. % of vulcanising agent is employed, based upon the total weight of bitumen and elastomer.

The elastomer is not especially limited provided that it has the qualities required for surfacing compositions. Such elastomers are well known in the art and are generally rubbery polymers. In a preferred embodiment, the elastomer comprises styrene butadiene styrene (SBS), hydrogenated SBS, styrene isoprene styrene (SIS), styrene ethylene butadiene styrene (SEBS) and/or polyisobutadiene (PIB).

The surfacing composition of the present invention has improved aging and stability properties and is preferably used for producing and/or repairing a road, pavement or track, or other surface for vehicles.

Typically such surfacing compositions are made up prior to transporting them to the site at which they are to be used. Once made up they are stored for up to three days at temperatures of around 180° C., to keep the bitumen from solidifying. Thus, stability at high temperatures is important for such compositions, and it is important that the compositions undergo as little phase separation as possible. The present surfacing compositions are especially stable, as shown in the ring and ball test (described below) as compared with prior art compositions.

The present invention will now be described with reference to the following specific embodiments, which are by way of Example only and are not intended to limit the invention.

EXAMPLES

In the following examples, the bitumens employed were a Venezuelan bitumen (Bitumen A) having a penetration of 87 at 25° C., and a Middle Eastern bitumen (Bitumen B) having a penetration of 74 at 25° C. Additionally five chinese bitumen have been tested. They have penetration values at 25° C. of 75, 58, 78, 83 respectively, for SH1, SH2, SH3 and SH4. The penetration test is a standard well known test in the industry, in which the depth of penetration of a needle into the bitumen is measured. It was measured here following the methods of standard test ASTM D-5-73 revised 95. All these bitumen were used for laboratory tests.

The elastomer employed in the laboratory tests was Finaprene® 503 (SBS—a 31/69 wt. % styrene/butadiene polymer). The elastomers employed in the industrial road compositions were Finaprene® 503 (SBS—a linear 31/69 wt. % styrene/butadiene polymer), Finaprene® 401 (a radial low molecular weight 20/80 wt % styrene/butadiene polymer) and Finaprene® 411X (a radial high molecular weight 30/70 wt % styrene/butadiene polymer)

The vulcanising agent comprised either:
(a) sulphur powder,
(b) 70/30 wt. % of sulphur/EVA pellets prepared by extrusion; or
(c) 70/30 wt. % of (80/20 wt. % sulphur/ZDBC)/EVA pellets prepared by compression.
(d) 30/62/3/3/2 wt % of EVA/sulphur/ZDBC/ZMBT/PIB pellets prepared by extrusion

Example 1

This is an example of the present invention.

Bitumen A was heated to 180° C. and 3 wt. % of Finaprene® 503 was added in pellet form, simultaneously with 0.1 wt. % vulcanisation agent © in pellet form, based on the total weight of bitumen and elastomer. After 120 minutes the mixture was homogeneous. The stability to storage was good (there was no phase separation) and confirmed the efficacy of the vulcanisation.

Example 2

This is an example of the present invention.

Bitumen B was heated to 180° C. and 5 wt. % of Finaprene® 503 was added in pellet form, simultaneously with 0.1 wt. % vulcanisation agent (b) in pellet form, based on the total weight of bitumen and elastomer. After 120 minutes the mixture was homogeneous. The stability to storage was good (there was no phase separation) and confirmed the efficacy of the vulcanisation.

Example 3

This is a comparative example employing a method of FR 2 737 216.

Bitumen B was heated to 180° C. and 5 wt. % of Finaprene® 503 was added in powder form, simultaneously with 0.1 wt. % vulcanisation agent (a) in powder form, based on the total weight of bitumen and elastomer. After 120 minutes the mixture was homogeneous. The stability to storage was less good than for Examples 1 and 2.

Stability and Aging Test Using the Ring and Ball Method.

The products of Example 2 and Comparative Example 3 were tested for stability. An internal standard method developed from the ring and ball method (ASTM-D36) was employed. The surfacing composition is coated on a ring after it has been made, then the ring is submerged in hot oil. The temperature at which the composition falls away from the ring is recorded. The composition is stored at high temperature for 3 days and the method is repeated. If the stability is good, the composition will retain its tackiness and the temperature will ideally remain as close to the originally measured temperature as possible. The larger the drop in temperature, the lower the stability of the composition and the worse its aging characteristics.

The results for the compositions formed in Examples 2 and 3 are shown below in Table 1.

TABLE 1

| | Drop in temp/° C. | |
|---|---|---|
| Mixing time/mins | Example 2 | Example 3 |
| 120 | 7 | 10 |
| 180 | 5 | 10 |

Table 1 shows that for mixing times of 2 and 3 hours, there is a lesser drop in temperature for the composition of the present invention compared with the closest prior art composition. This highlights the improvement in aging and stability characteristics of the present compositions.

Examples 4 to 7

In these examples, several surfacing compositions were prepared from the Chinese Bitumens SH1, SH2, SH3 and SH4, with various elastomers in different amounts and optionally with various amounts of heavy furfurol extract. The compositions according to the present invention were prepared with 0.1 wt % of vulcanising agent d) in pellet form and the comparative examples were prepared without vulcanising agent. The compositions and results are displayed in Tables 2 to 5. In these examples, the ductility was measured following the method of standard test IP 32/55, the kinematic viscosity of asphalt was measured following the method of standard test ASTM D 2170 and the elastic recovery was measured following the method of standard test DIN V 52021-1.

TABLE 2

Bitumen SH1.

| Composition | | wt % | wt % | wt % |
|---|---|---|---|---|
| Bitumen SH1 | | 96.5 | 96.4 | 95.5 |
| Finaprene ® 503 | | — | — | — |
| Finaprene ® 401 | | 3.5 | 3.5 | 4.5 |
| Vulcanising agent | | — | 0.1 | — |
| Heavy furfurol extract | | — | — | — |
| Properties | | | | |
| Ring and ball temperature-° C. | | 68 | 70 | 80 |
| Penetration | 5° C.-1/10 mm | 10 | 11 | 13 |
| | 15° C.-1/10 mm | 18 | 20 | 18 |
| | 25° C.-1/10 mm | 51 | 55 | 54 |
| Viscosity | 135° C.-Pa · s | 1.22 | 1.47 | 1.54 |
| | 150° C.-Pa · s | 0.72 | 0.84 | 0.89 |
| Ductility | 5° C.-cm | 13 | 14 | 20 |
| | 13° C.-cm | 60 | 80 | 60 |
| | 25° C.-cm | 62 | 87 | 58 |
| Elastic recovery-% | | 92 | 95 | 97 |
| Storage stability (48 hrs at 163° C.) | | no | yes | no |

TABLE 3

Bitumen SH2.

| Composition | wt % | wt % | wt % | wt % | wt % |
|---|---|---|---|---|---|
| Bitumen SH2 | 97.5 | 97.4 | 96.5 | 96.4 | 95.5 |
| Finaprene ® 503 | — | — | — | — | — |
| Finaprene ® 401 | 2.5 | 2.5 | 3.5 | 3.5 | 4.5 |
| Vulcanising agent | — | 0.1 | — | 0.1 | — |
| Heavy furfurol extract | — | — | — | — | — |
| Properties | | | | | |
| Ring and ball temperature –° C. | 53 | 55 | 67 | 69 | 74 |
| Penetration 5° C.-1/10 mm | 9 | 10 | 9 | 10 | 9 |
| 15° C.-1/10 mm | 16 | 10 | 15 | 17 | 16 |
| 25° C.-1/10 mm | 47 | 44 | 43 | 51 | 44 |
| Viscosity 135° C.-Pa · s | 1.16 | 1.16 | 1.31 | 1.52 | 1.76 |
| 150° C.-Pa · s | 0.63 | 0.70 | 0.79 | 0.85 | 0.98 |
| Ductility 5° C.-cm | 6 | 1 | 8 | 8 | 14 |
| 13° C.-cm | 24 | 41 | 52 | 58 | 60 |
| 25° C.-cm | 97 | >130 | 54 | 82 | 53 |
| Elastic recovery-% | 35 | 58 | 93 | 93 | 98 |
| Storage stability (48 hrs at 163° C.) | no | yes | no | yes | No |

TABLE 4

Bitumen SH3.

| Composition | Wt % | wt % | wt % | wt % | wt % | wt % | wt % | wt % | wt % | wt % | wt % | wt % |
|---|---|---|---|---|---|---|---|---|---|---|---|---|
| Bitumen SH3 | 96.5 | 96.4 | 95.5 | 97.5 | 97.4 | 97.5 | 97.5 | 96.5 | 96.4 | 96.5 | 96.5 | 95.5 |
| Finaprene ® 503 | 3.5 | 3.5 | 4.5 | — | — | — | — | — | — | — | — | — |
| Finaprene ® 401 | — | — | — | 2.5 | 2.5 | 2.5 | 2.5 | 3.5 | 3.5 | 3.5 | 3.5 | 4.5 |
| Vulcanising agent | — | 0.1 | — | — | 0.1 | — | — | — | 0.1 | — | — | — |
| Heavy furfurol extract | — | — | — | — | — | 5% | 10% | — | — | 5% | 10% | — |
| Properties | | | | | | | | | | | | |
| Ring and ball temperature-° C. | 52 | 54 | 93 | 50 | 52 | 48 | 45 | 70 | 72 | 65 | 58 | 76 |
| Penetration 5° C.-1/10 mm | 13 | 12 | 11 | 11 | 10 | — | — | 10 | 12 | — | — | 10 |
| 15° C.-1/10 mm | 22 | 23 | 22 | 21 | 20 | — | — | 21 | 21 | — | — | 21 |
| 25° C.-1/10 mm | 57 | 60 | 53 | 66 | 60 | 88 | 124 | 58 | 57 | 74 | 110 | 53 |
| Viscosity 135° C.-Pa · s | 1.03 | 1.12 | 1.28 | 0.89 | 0.99 | 0.86 | 0.67 | 1.18 | 1.30 | 0.95 | 0.79 | 1.51 |
| 150° C.-Pa · s | 0.63 | 0.66 | 0.79 | 0.55 | 0.59 | — | — | 0.67 | 0.78 | — | — | 0.82 |
| Ductility 5° C.-cm | 20 | 32 | 39 | 11 | 11 | 22 | 57 | 22 | 19 | 46 | 77 | 26 |
| 13° C.-cm | 71 | 73 | 102 | 37 | 54 | — | — | 49 | 74 | — | — | 66 |
| 25° C.-cm | >140 | >140 | 103 | 110 | >130 | — | — | 52 | 65 | — | — | 52 |
| Elastic recovery-% | 68 | 68 | 98 | 28 | 60 | 65 | 58 | 98 | 95 | 95 | 95 | 100 |
| Storage stability (48 hrs at 163° C.) | no | yes | no | yes | Yes | yes | yes | no | yes | yes | yes | no |

TABLE 5

| Composition | Bitumen SH4. | | | | | |
|---|---|---|---|---|---|---|
| | wt % | wt % | wt % | wt % | wt % | wt % |
| Bitumen SH4 | 97 | 96.9 | 96.5 | 96.4 | 96 | 95.9 |
| Finaprene ® 503 | — | — | — | — | — | — |
| Finaprene ® 401 | 3 | 3 | 3.5 | 3.5 | 4 | 4 |
| Vulcanising agent | — | 0.1 | — | 0.1 | — | 0.1 |
| Properties | | | | | | |
| Ring and ball Temperature-° C. | 57 | 59 | 73 | 74 | 80 | 82 |
| Penetration 5° C.-1/10 mm | 10 | 12 | 14 | 11 | 11 | 11 |
| 15° C.-1/10 mm | 23 | 20 | 22 | 23 | 19 | 19 |
| 25° C.-1/10 mm | 68 | 57 | 43 | 6 | 58 | 55 |
| Viscosity 135° C.-Pa · s | 1.00 | 1.16 | 1.09 | 1.10 | 1.2 | 1.47 |
| 150° C.-Pa · s | 0.61 | 0.65 | 0.72 | 0.77 | 0.74 | 0.86 |
| Ductility 5° C.-cm | 15 | 21 | 16 | 41 | 25 | 27 |
| 13° C.-cm | 46 | 51 | 70 | 96 | 72 | 84 |
| 25° C.-cm | 54 | 109 | 55 | 7 | 56 | 70 |
| Elastic recovery-% | 78 | 73 | 95 | 98 | 98 | 98 |
| Storage stability (48 hrs at 163° C.) | yes | yes | no | yes | no | Yes |

The results displayed in Tables 2 to 5 clearly show that all the bitumen compositions prepared according to the present inventions had excellent storage stability. In addition, as desired, the ring and ball temperature was higher for the compositions of the present invention. The viscosity was also higher for the compositions using the vulcanising agent of the invention resulting in a better cohesion and so was the ductility. It must be observed in Table 4 that a higher ductility can be obtained by the addition of 5 to 10 wt % of heavy furfurol extract, but at the expense of the ring and ball temperature that is lower and at the expense of the penetration value that is higher.

Industrial Examples

Two road compositions have been prepared with the Chinese bitumen SH2, the elastomer Finaprene® 503 and the vulcanising composition d) in pellet form and in powder form respectively. The small drop in temperature observed for the laboratory tests of Examples 1 and 2 was confirmed for the industrial examples. This can be seen in Table 6 showing the drop in ring and ball temperature as a function of ageing for the same vulcanising agent in pellet form and in powder form.

TABLE 6

| Difference in Ring and Ball Temperature after ageing. | | |
|---|---|---|
| Vulcanising agent ΔT ° C. | Pellets | Powder |
| 1 day at 180° C. | 2.3 | 5.6 |
| 2 days at 180° C. | 3.3 | 6.0 |
| 3 days at 180° C. | 3.3 | 5.7 |

What is claimed is:

1. A process for producing a surfacing composition comprising contacting bitumen with an elastomer and a pelletized vulcanizing agent comprising pellets incorporating a particulate sulfur agent and a binder for said sulfur agent which holds the particles of the sulfur agent together to form pellets which are larger than the sulfur agent particles without the incorporation of a binder.

2. A process according to claim 1 wherein said bitumen is contacted with said elastomer and said vulcanizing agent at a temperature of at least 100° C.

3. The process of claim 2 wherein said bitumen and elastomer and vulcanizing agent are contacted at a temperature within the range of 120–200° C.

4. The process of claim 2, wherein said elastomer and said bitumen are contacted in relative amounts of 1–15 parts by weight of said elastomer and 85–99 parts by weight by said bitumen.

5. The process of claim 4 wherein said elastomer and said bitumen are contacted in relative amounts of 1–10 parts by weight of said elastomer and 90–99 parts by weight of said bitumen.

6. The process of claim 4 wherein said vulcanizing agent is added in an amount within the range of 0.01–10 wt. % of the total weight of said bitumen and said elastomer.

7. The process of claim 6 wherein said vulcanizing agent is added in an amount within the range of 0.1–5 wt. % of the total weight of said bitumen and said elastomer.

8. The process of claim 1 wherein the elastomer is selected from the group consisting of styrene butadiene styrene, hydrogenated styrene butadiene styrene, styrene isoprene styrene, styrene ethylene butadiene styrene, polyisobutadiene and mixtures thereof.

9. The process of claim 1 wherein said surfacing composition is incorporated into a road pavement.

10. The process of claim 1 wherein said elastomer and said pelletized vulcanizing agent are added together to said bitumen.

11. The process of claim 1 wherein said pellets incorporate said particulate sulfur agent in an amount within the range of 10–80 wt. % and said binder in an amount within the range of 20–90 wt. %.

12. The process of claim 11 wherein said sulfur agent comprises elemental sulfur in an amount within the range of 10–100 wt. %.

13. The process of claim 12 wherein said sulfur agent comprises a sulfur-containing compound in an amount of up to 90 wt. % of said pelletized vulcanizing agent.

14. The process of claim 13 wherein said sulfur-containing compound in said pelletized vulcanizing agent comprises a sulfur donor.

15. The process of claim 14 wherein said sulfur-containing compound in said pelletized vulcanizing agent is selected from the group consisting of zinc dibutyldithiocarbamate and zinc mercaptobenzothiazol.

16. The process of claim 14 wherein the binder in said pelletized vulcanizing agent is selected from the group consisting of a wax, a hydrocarbon resin, a co-polymer of ethylene and an acrylic acid, polyethylene, glycol monostearate, and ethyl vinyl alcohol, and mixtures thereof.

* * * * *